United States Patent
Hu et al.

(10) Patent No.: US 7,028,120 B2
(45) Date of Patent: Apr. 11, 2006

(54) APPARATUS AND METHOD FOR REDUCING LDRQ INPUT PIN COUNT OF A LOW PIN COUNT HOST USING SERIALLY COUPLED PERIPHERAL DEVICES

(75) Inventors: Chih-Wei Hu, Taipei (TW); Chia-Chun Lien, Taipei (TW); Wallace Huang, Taipei (TW)

(73) Assignee: Via Technologies, Inc., Taipei (TW)

( * ) Notice: Subject to any disclaimer, the term of this patent is extended or adjusted under 35 U.S.C. 154(b) by 274 days.

(21) Appl. No.: 10/314,201

(22) Filed: Dec. 9, 2002

(65) Prior Publication Data

US 2003/0233505 A1 Dec. 18, 2003

(30) Foreign Application Priority Data

Jun. 18, 2002 (TW) .............................. 91113219 A

(51) Int. Cl.
*G06F 1/00* (2006.01)

(52) U.S. Cl. .................... 710/240; 710/244; 710/24

(58) Field of Classification Search ........ 710/240–244, 710/305–314, 107–110, 113–125, 22–25, 710/36–40
See application file for complete search history.

(56) References Cited

U.S. PATENT DOCUMENTS

| | | | | |
|---|---|---|---|---|
| 5,475,854 A | * | 12/1995 | Thomsen et al. | 710/23 |
| 5,634,069 A | * | 5/1997 | Hicok et al. | 710/33 |
| 6,131,127 A | * | 10/2000 | Gafken et al. | 710/1 |
| 6,151,654 A | * | 11/2000 | Poisner et al. | 710/240 |
| 6,157,970 A | * | 12/2000 | Gafken et al. | 710/27 |
| 2003/0093607 A1 | * | 5/2003 | Main et al. | 710/306 |

* cited by examiner

*Primary Examiner*—Rehana Perveen
*Assistant Examiner*—Raymond N Phan
(74) *Attorney, Agent, or Firm*—Rosenberg, Klein & Lee

(57) ABSTRACT

An apparatus and method for reducing LDRQ input pin count of a low pin count (LPC) host are provided. The LPC host is series of connecting with a plurality of peripheral devices, the peripheral device having a LDRQ control device within. The LDRQ control device comprises a LDRQ to DRQ decoder, a DRQ arbiter, and a DRQ to LDRQ encoder. In the LDRQ control device, a LDRQ signal is decoded into a DRQ signal via the LDRQ to DRQ decoder and then the DRQ signal is priority arbitrated via the DRQ arbiter. Next, the arbitrated DRQ signal is transferred into a LDRQ signal via DRQ to LDRQ encoder. Following, the LDRQ signal is outputted into the next stage peripheral device or to output into a LDRQ input pin of the LPC host, so as the LPC host only need one LDRQ input pin for purposing to effectively reduce the LDRQ input pin count and lower the manufacturing cost of the LPC host.

14 Claims, 4 Drawing Sheets

APPARATUS AND METHOD FOR REDUCING LDRQ INPUT PIN COUNT OF A LOW PIN COUNT HOST USING SERIALLY COUPLED PERIPHERAL DEVICES

BACKGROUND OF THE INVENTION

1. Field of the Invention

The present invention generally relates to a method for reducing input pin count of a low pin count (LPC) host, and more particularly to an apparatus for reducing LDRQ input count of the LPC host.

2. Description of the Prior Art

Presently, with the development trend of the stop less integrated and compact size of the main board, Intel Corp. has disclosed a low pin count (LPC) interface. The standard LPC interface having less ten pins will replace the industry standard architecture (ISA) interface, which still requires sixty pins. After disclosing the new LPC standard interface, the LPC bus is commonly used and the following development is the LPC peripheral device are increasingly appeared in the market. If the LPC peripheral device has the require of performing the direct memory access (DMA) or the bus master request, the LPC peripheral device will send a request signal of LDRQ signal to the LPC host. Referring to the FIG. 1, it is a functional block diagram of the connection of the low pin count (LPC) host and the peripheral devices, in accordance with the prior art. Such as shown in the FIG. 1, the first peripheral device 1, the second peripheral device 2, and the third peripheral device 3 is respectively connecting to the LPC host 7 through the LDRQ signal line 4, 5, and 6 for probably having a direct memory access (DMA) request or a bus master request. Specifically, each of the three peripheral devices must individually connects with one LDRQ signal line. In another word, if there were N peripheral devices on the LPC bus, then the LPC host would include N LDRQ input pins. So, with the increasingly amount of the peripheral device on the LPC bus, the LDRQ input pin count of the LPC host will be getting more and more, and further following the increase of the manufacturing cost.

Obviously, the main spirit of the present invention is to provide an apparatus and method for reducing an LDRQ input pin count of a low pin count (LPC) host and lower the manufacturing cost of the LPC host, and then some disadvantages of well-known technology are overcome.

SUMMARY OF THE INVENTION

It is an object of the invention is to provide an apparatus and method for reducing an LDRQ input pin count of a low pin count (LPC) host. A LDRQ control device is arranged within various peripheral devices of the LDRQ host on the LPC bus, wherein said various peripheral devices have a direct memory access (DMA) request and a bus master request, and said LDRQ control device is series of connecting with the LDRQ input pin of those various peripheral devices. The present invention can effectively reduce the LDRQ input pin count of the LPC host and the LPC host only utilizes one LDRQ input pin.

It is another object of the invention is to provide an apparatus and method for reducing an LDRQ input pin count of a low pin count (LPC) host and lower the manufacturing cost of the LPC host.

In order to achieve previous objects, the present invention provides an apparatus and method for reducing an LDRQ input pin count of a low pin count (LPC) host. The present invention utilizes a LPC host arranged within at least a peripheral device, wherein the peripheral device is series of connecting with the LPC host. The LDRQ control device comprises a LDRQ to DRQ decoder, a DRQ arbiter, and aDRQ to LDRQ encoder. The method comprises following steps of an inputted LDRQ signal into the LDRQ control device, which is decoded to obtain a DRQ signal, and then the DRQ signal is outputted into the DRQ arbiter; the DRQ signal inputted from prior stage and the DRQ signals within the peripheral device are priority arbitrated; each priority arbitrated DRQ signal is encoded via the DRQ to LDRQ encoder for obtaining a LDRQ signal to output into a peripheral device which is series of connecting at coming stage or outputting into an LDRQ input pin of the LPC host.

Other aspects, features, and advantages of the present invention will become apparent, as the invention becomes better understood by reading the following description in conjunction with the accompanying drawings.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE PREFERRED EMBODIMENT

With the increasing amount of the peripheral devices on the LPC bus, the amount of the LDRQ input pin count is required to be getting more and more, so as to, causing the increase of the manufacturing cost of the LPC host. The method and the apparatus of the present invention disclosed herein can effectively solve the prior disadvantages.

Figure 1:
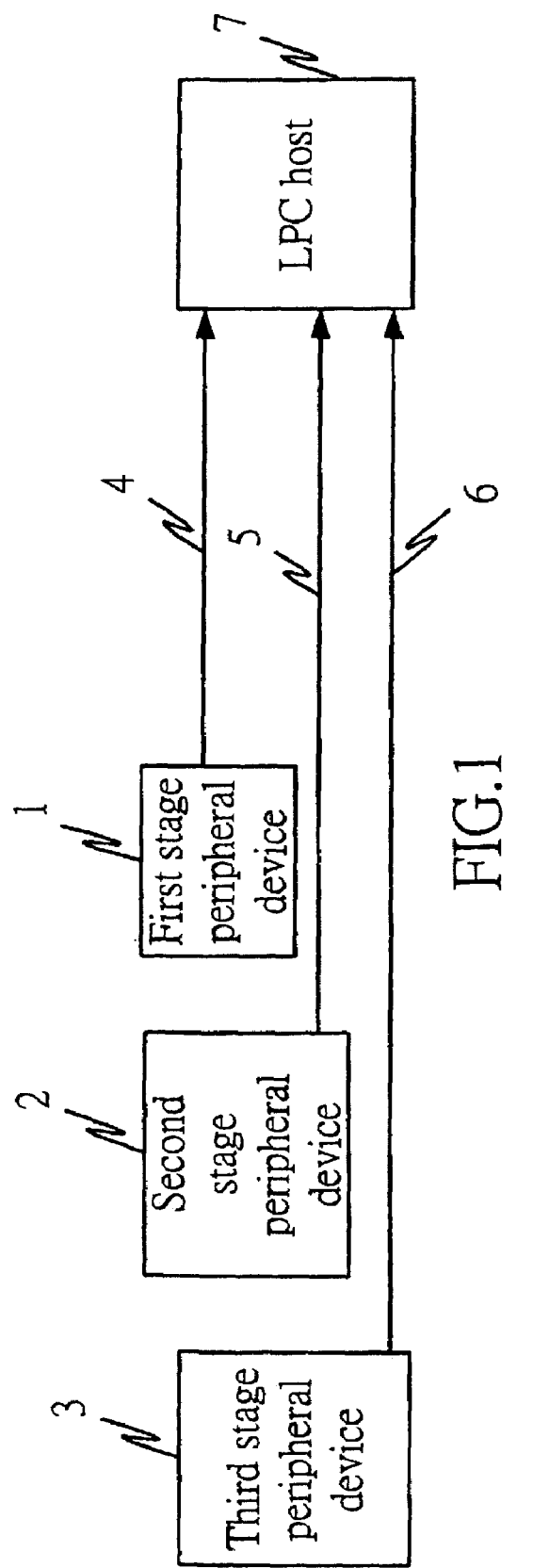
FIG. 1 is a functional block diagram of the connection with the low pin count (LPC) host and the peripheral devices, in accordance with the prior art.
Figure 2:
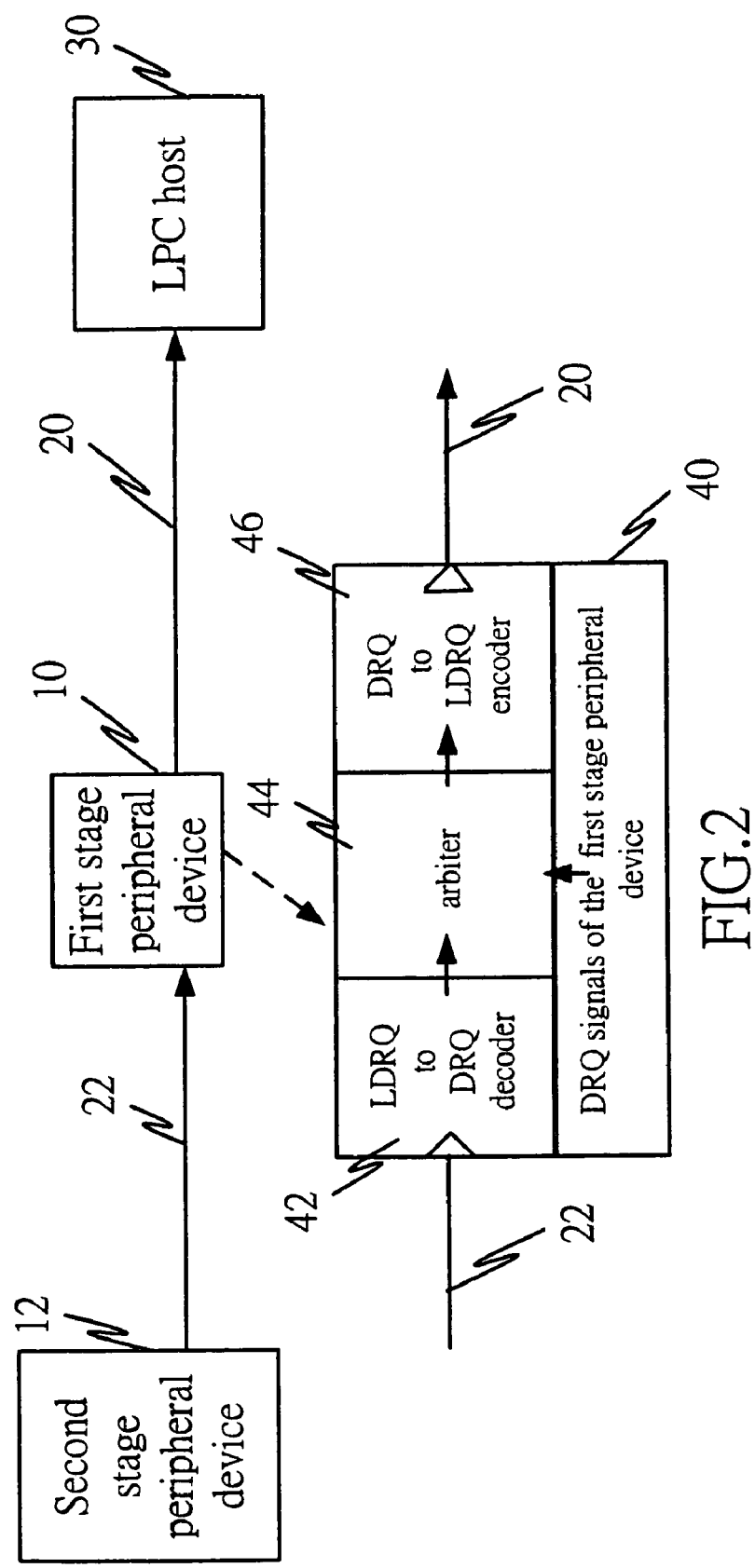
FIG. 2 is a functional block diagram of the connection with the low pin count (LPC) host and the peripheral devices, in accordance with the present invention.

First, referring to the FIG. 2, it is a functional block diagram of the connection with the low pin count (LPC) host and the peripheral devices, in accordance with the present invention. Two peripheral devices are series of connecting to the LPC host 30 through the LDRQ signal line 20 and 22, such as two stages connection, a first stage peripheral device 10 and a second stage peripheral device 12. A LDRQ control device 40 is arranged within the first stage peripheral device 10, within the LDRQ control device 40 comprising a LDRQ to DRQ decoder 42, a DRQ arbiter 44, and a DRQ to LDRQ encoder 46. When the second stage peripheral device 12 has DMA request or the bus master request, it will send a LDRQ signal through a LDRQ signal line 22 to the LDRQ input pin of the first stage peripheral device 10. In the other word, the LDRQ signal is inputted into the LDRQ to DRQ decoder 42 arranged within the LDRQ control device 40, and then the LDRQ to DRQ decoder 42 decodes the inputted LDRQ signal to the DRQ signal. Sequentially, the DRQ signal is priority arbitrated with the identify DRQ signal of the first stage peripheral device 10 via the DRQ arbiter 44. The order of the priority arbitration is arranged and depended on the functional importance of each of the two stage peripheral device 10 and 12. Next, after transferring the DRQ signal into the LDRQ signal via the DRQ to LDRQ encoder 46, the LDRQ signal will be sent to the LPC host 30 through LDRQ signal line 20.

Thus, when the second stage peripheral device 12 has the DMA request or the bus master request, it would send a LDRQ signal into the LDRQ to. DRQ decoder 42 arranged within the LDRQ control device 40 of the first stage peripheral device 10 to decode the LDRQ signal to a DRQ signal. And, the DRQ signal is priority arbitrated with the identify DRQ signal of the first stage peripheral device 10 via the DRQ arbiter 44. Further, the arbitrated DRQ signal will be transferred to the LDRQ signal via the DRQ to LDRQ encoder 46 and then outputted to the LPC host 30. Therefore, the method and the apparatus of the present invention may effectively reduce two LDRQ input pins of the prior LPC host with two LDRQ signal lines to be one LDRQ input pin.

Figure 3:
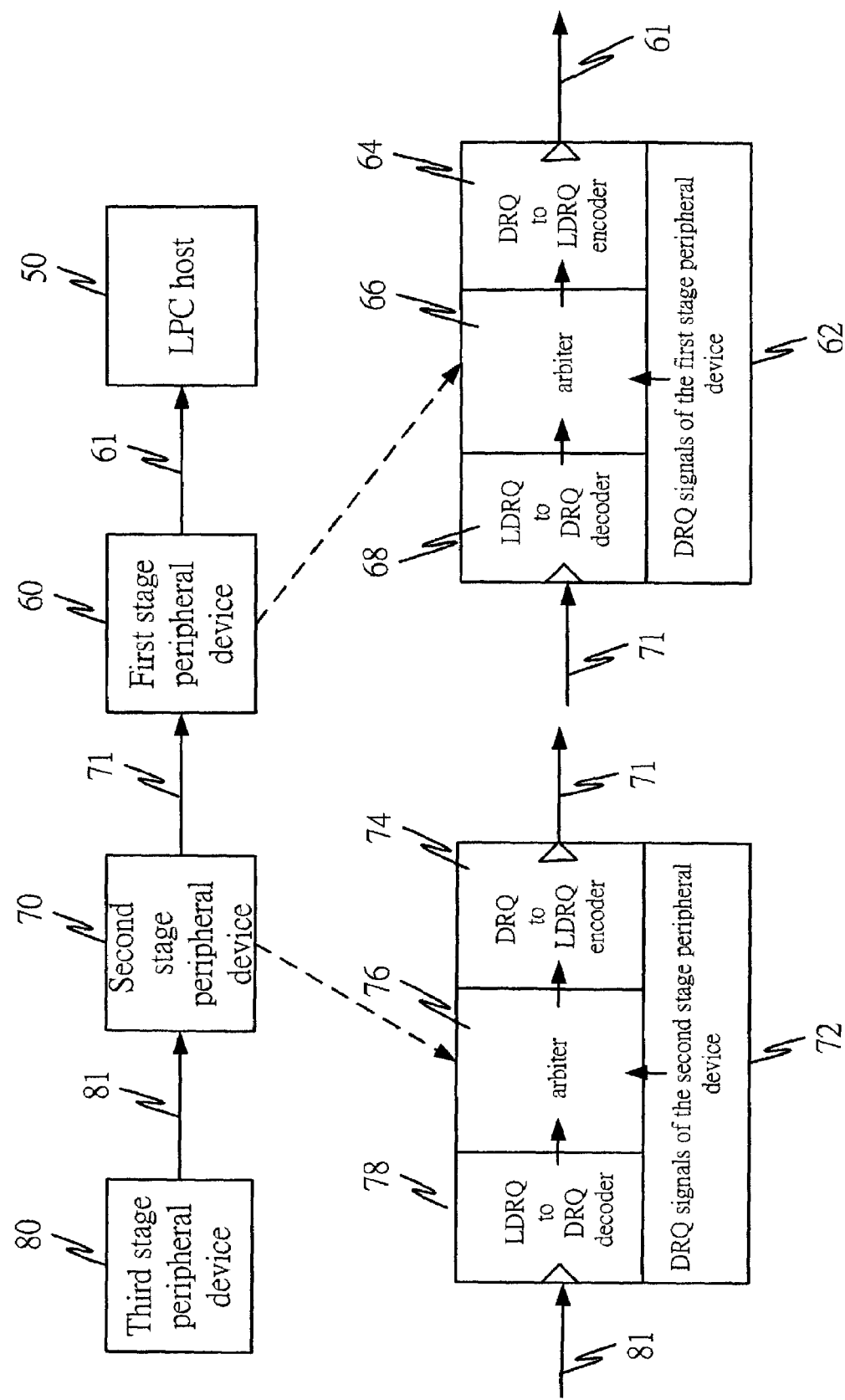
FIG. 3 is another functional block diagram of the connection with the low pin count (LPC) host and the peripheral devices, in accordance with the present invention.
Figure 4:
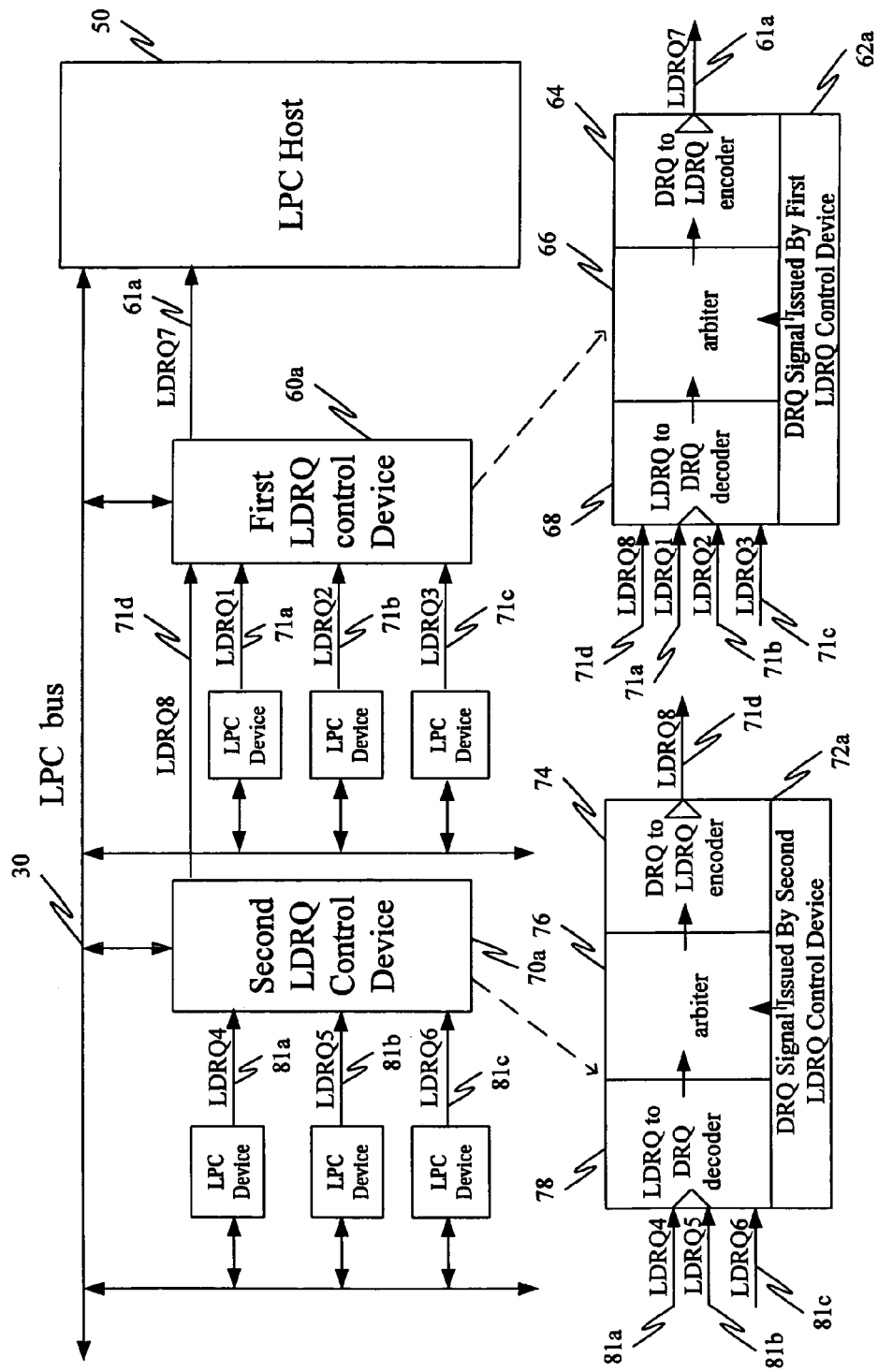
FIG. 4 is a more detailed functional block diagram of the connection with the low pin count (LPC) host and the peripheral devices, in accordance with the present invention.

Referring to the FIG. 3, it is another functional block diagram of the connection with the low pin count (LPC) host and the peripheral devices, in accordance with the present invention. The LDRQ input pins of the LPC host 50 are series of connecting with three peripheral devices, such as three stages connection, a first stage peripheral device 60, a second stage peripheral device 70, and a third stage peripheral device 80. The second stage peripheral device 70 and the first stage peripheral device 60 are individually arranged a LDRQ control device 62 and 72, comprising a LDRQ to DRQ decoder 68 and 78, a DRQ arbiter 66 and 76, and a DRQ to LDRQ encoder 64 and 74. When the third stage peripheral device 80 has DMA request or the bus master request to output a LDRQ signal, the LDRQ signal is sent through a LDRQ signal line 81 to the LDRQ control device 72 arranged with the second stage peripheral device 70. Within the LDRQ control device 72, the LDRQ to DRQ decoder 78 decodes the LDRQ signal to a DRQ signal. And, the DRQ signal is priority arbitrated with the identify DRQ signal of the second stage peripheral device 70 via the DRQ arbiter 76. Further, the arbitrated DRQ signal will be transferred to the LDRQ signal via the DRQ to LDRQ encoder 74 and then outputted to the first stage peripheral through the LDRQ signal line 71. As the same steps, the LDRQ to DRQ decoder 68 of the DRQ control device 62 decodes the LDRQ signal to a DRQ signal. And, the DRQ signal is priority arbitrated with the identify DRQ signal of the first stage peripheral device 60 via the DRQ arbiter 66. Further, the arbitrated DRQ signal will be transferred to the LDRQ signal via the DRQ to LDRQ encoder 64 and then outputted to the LPC host 50 through the LDRQ signal line 61.

In view of above two embodiments, no matter how many peripheral devices on the LPC bus have DMA request or the bus master request (In the prior art, N requests needs N LDRQ input pins). The present invention is only necessary to arrange the LDRQ control device within the individual series of connecting peripheral devices (Except for peripheral device arranged most far from the host without the requirement.). According to the series of connecting architecture, the LPC host only has one LDRQ input pin to achieve all purposes. So, under the situation that the LPC bus is commonly used and the following development is the LPC peripheral devices are increasingly appeared in the market, with the series of connecting architecture of the LDRQ control devices used in peripheral devices, the present invention can keep the original input pin count of the LDRQ signal of the LPC host and achieve the performance of a plurality of peripheral devices. Conclusively, the present invention mainly reduces the LDRQ input pin count under the LPC Bus Agreement and lowers the manufacturing cost of the LPC host.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A method for reducing an encoded direct memory access request (LDRQ) signal input pin count of a low pin count (LPC) host, wherein said LPC host is connected in series with a plurality of peripheral devices, each of said plurality of peripheral devices having an LDRQ control device therein, said method comprising the steps of:
    decoding an input LDRQ signal from a prior stage peripheral device into said LDRQ control device to obtain a direct memory access request (DRQ) signal;
    priority arbitrating said DRQ signal input from said prior stage peripheral device and a DRQ signal generated locally by said peripheral device based on a functional importance of said peripheral devices; and
    encoding said priority arbitrated DRQ signal to obtain an LDRQ signal to output to a next stage peripheral device or an LDRQ input pin of said LPC host.

2. The method for reducing LDRQ input pin count of a LPC host according to claim 1, wherein said LDRQ signal input to said LDRQ control device is an LDRQ signal output from said prior stage peripheral device.

3. The method for reducing LDRQ input pin count of a LPC host according to claim 1, wherein a DRQ arbiter performs the step of priority arbitrating said DRQ signal.

4. An apparatus for reducing an encoded direct memory access request (LDRQ) signal input pin count of a low pin count (LPC) host, wherein said LPC host is connected in series with a plurality of peripheral devices, and each of said plurality of peripheral devices having an LDRQ control device therein, said apparatus comprising:
    a decoder for decoding an input LDRQ signal to a direct memory access request (DRQ) signal;
    a DRQ arbiter for priority arbitrating said decoded DRQ signal and a locally generated DRQ signal within said peripheral device; and
    a DRQ to LDRQ encoder for encoding said priority arbitrated DRQ signal to a LDRQ signal output to a next stage peripheral device or an LDRQ input pin of said LPC host.

5. An LDRQ controller for reducing an encoded direct memory access request (LDRQ) signal pin of a low pin count (LPC) bus host, with said low pin count bus host is coupled to at least one LDRQ control device, said low pin count bus host is connected with a plurality of low pin count bus devices, said LDRQ controller being incorporated within said LDRQ control device, said LDRQ controller comprising:
    a decoding circuit for decoding LDRQ signals into DRQ signals;
    a DRQ control circuit used to have a priority arbitration process with received DRQ signals and DRQ signal issued by oneself; and
    an encoding circuit for translating received DRQ signals into LDRQ signals and transferring said LDRQ signals to either a LDRQ control device of next stage or a LDRQ signal pin of said low pin count bus host.

6. The LDRQ controller according to claim 5 wherein said decoding circuit is used to translate said LDRQ signals into encoded signals.

7. The LDRQ controller according to claim 5, wherein LDRQ control devices are sequentially connected in series with said low pin count business according to the functionality of LDRQ control device.

8. The LDRQ controller according to claim 5 wherein said low pin count bus host is provided with a signal pin.

9. A method for reducing an encoded direct memory access request (LDRQ) signal input pin of a low pin count (LPC) bus host, said low pin count bus host is connected in series with at least one LDRQ control device, and said LDRQ device is connected with a plurality of low pin count bus devices, said method comprises the steps of:

obtaining DRQ signals by decoding LDRQ signals received by said LDRQ control device;

having a priority arbitration process with said DRQ signals and a DRQ signal issued by said LDRQ control device; and encoding a DRQ signal having a highest priority being resulted from said priority arbitration process into a LDRQ signal, transferring said LDRQ signal to either a LDRQ control device of next stage connected in series therewith or a LDRQ signal pin of said low pin count bus host.

10. The method according to claim 9 wherein LDRQ signals received by said LDRQ control device are issued by said plurality of low pin count bus devices.

11. The method according to claim 9 wherein said LDRQ signals received by said LDRQ control device are provided by a LDRQ control device of former stage and said plurality of low pin count bus devices.

12. The method according to claim 9 wherein said priority arbitration process is carried out by a DRQ control circuit.

13. The method according to claim 9 wherein said step of encoding a DRQ signal having a highest priority being resulted from said priority arbitration process into a LDRQ signal is accomplished by an encoding circuit.

14. The method according to claim 9 wherein said LDRQ signal and said DRQ signals are present in the form of binary digits.

* * * * *